United States Patent
French et al.

(10) Patent No.: US 8,208,160 B2
(45) Date of Patent: Jun. 26, 2012

(54) SYSTEM AND METHOD FOR PRINTING A USER GUIDE FOR A PRODUCT

(75) Inventors: William M. French, Boise, ID (US); Stephen B. Jones, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 906 days.

(21) Appl. No.: 12/229,785

(22) Filed: Aug. 27, 2008

(65) Prior Publication Data

US 2010/0053644 A1    Mar. 4, 2010

(51) Int. Cl.
*G06F 3/12* (2006.01)

(52) U.S. Cl. ............ 358/1.15; 705/7.29; 705/7.34; 705/14.37; 705/26.8; 358/1.1; 358/1.16

(58) Field of Classification Search .......... 358/1.1, 358/1.13, 1.15
See application file for complete search history.

(56) References Cited

U.S. PATENT DOCUMENTS

| | | | |
|---|---|---|---|
| 5,974,401 A | 10/1999 | Enomoto et al. | |
| 6,616,702 B1 | 9/2003 | Tonkin | |
| 6,659,662 B2 | 12/2003 | Grohs | |
| 6,678,750 B2 | 1/2004 | Meade, II et al. | |
| 6,771,384 B1 | 8/2004 | Laverty et al. | |
| 6,972,861 B1 * | 12/2005 | van Zee et al. | 358/1.15 |
| 6,992,786 B1 | 1/2006 | Breding et al. | |
| 7,042,585 B1 | 5/2006 | Whitmarsh et al. | |
| 7,136,178 B1 * | 11/2006 | Gupta et al. | 358/1.15 |
| 7,148,989 B2 | 12/2006 | Hitaka | |
| 7,355,759 B1 | 4/2008 | Kokusho | |
| 2002/0078160 A1 | 6/2002 | Kemp et al. | |
| 2002/0116294 A1 | 8/2002 | Ranck et al. | |
| 2002/0120537 A1 * | 8/2002 | Morea et al. | 705/35 |
| 2005/0073717 A1 * | 4/2005 | Arakawa | 358/1.15 |
| 2007/0121144 A1 * | 5/2007 | Kato | 358/1.15 |
| 2007/0296981 A1 * | 12/2007 | Lee et al. | 358/1.1 |
| 2007/0296994 A1 * | 12/2007 | Radiya | 358/1.13 |
| 2008/0004920 A1 * | 1/2008 | Bird et al. | 705/5 |
| 2008/0195628 A1 * | 8/2008 | Kim et al. | 707/10 |
| 2009/0040544 A1 * | 2/2009 | Matsuhara et al. | 358/1.15 |
| 2009/0059284 A1 * | 3/2009 | Kitagata | 358/1.15 |
| 2009/0157460 A1 * | 6/2009 | Narayanaswamy | 705/8 |

* cited by examiner

*Primary Examiner* — Benny Q Tieu
*Assistant Examiner* — Juan Guillermety (57) ABSTRACT

Systems, methods, and other embodiments associated with printing user documentation are described. One example method includes receiving a print request and determining if the print request is for printing a user guide. If the request is for printing a user guide, then the method may retrieve an updated version of the user guide. The print request may be modified by adding the updated version to the print request. The user guide is printed using the updated version.

24 Claims, 5 Drawing Sheets

SYSTEM AND METHOD FOR PRINTING A USER GUIDE FOR A PRODUCT

BACKGROUND

Typically consumer products are sold to customers with printed manuals, user guides or other related documentation. In an effort to save on the cost associated with such printed materials, it would be preferable for manufacturers to provide only electronic versions of the manuals and rely on the user to access the electronic versions. The electronic version of such printed documentation could be preloaded on the consumer product, provided on a disk that is shipped with the product when it is purchased, or can be accessed on-line from a website. However, some customers still prefer a printed version of such documentation rather than only having access to an electronic version. Additionally, versions of such documentation that is preloaded onto a disk or the consumer product at the time of manufacture may not be the current version by the time the product is finally used by a customer.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and other embodiments associated with printing user guides. The example embodiments give customers the ability to print documents at a convenient location that can be picked up any time, anywhere. The term user guide will be used to refer, but is not limited to, product manuals and other documentation related to any products, consumer, commercial, and the like, such as, without limitation, computers, computer products, printers, scanners, cameras, software, and/or other products for which such documentation may be provided with the product. In one example of such a system, a print guide utility is configured to send a print request to a print shop computer located in a desired location. The print shop computer determines if the request is to print a user guide. If it is a request for a user guide, then the print shop computer checks for updated versions of the user guide. The print request can then be modified to include one or more of the updates and then the updated user guide can be printed. By sending the print request to a print shop like Kinko's, professional finishing can also be applied that cannot be performed by a typical home printer.

In another embodiment, partnerships can be created between producers of products and print shops so that the print shops can print the producer's user guides. In this manner, predetermined printing processes can be established for the convenience of users and to ensure quality printing and binding. Thus a print shop link on a user computer that is associated to a back-end printing process at a partner print shop can provide an easy way for customers to print a user guide.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-RW: CD rewriteable.
DVD: digital versatile disk and/or digital video disk.
RAM: random access memory.
DRAM: dynamic RAM.
SRAM: synchronous RAM.
ROM: read only memory.

"computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table that is organized in a certain structure. In other examples, "database" may be used to refer to a set of tables. In still other examples, "database" may refer to a set of data stores and methods for accessing and/or manipulating those data stores.

"data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals are stored, transferred, combined, compared, and otherwise manipulated in a logic, and so on. The physical manipulations create a concrete, tangible, useful, real-world result. It is appreciated that throughout the description, terms including processing, retrieving, determining, requesting, displaying, and so on, refer to actions and processes of a computer system, logic, processor, or similar electronic device that manipulates and transforms data represented as physical (electronic) quantities.

Figure 1:
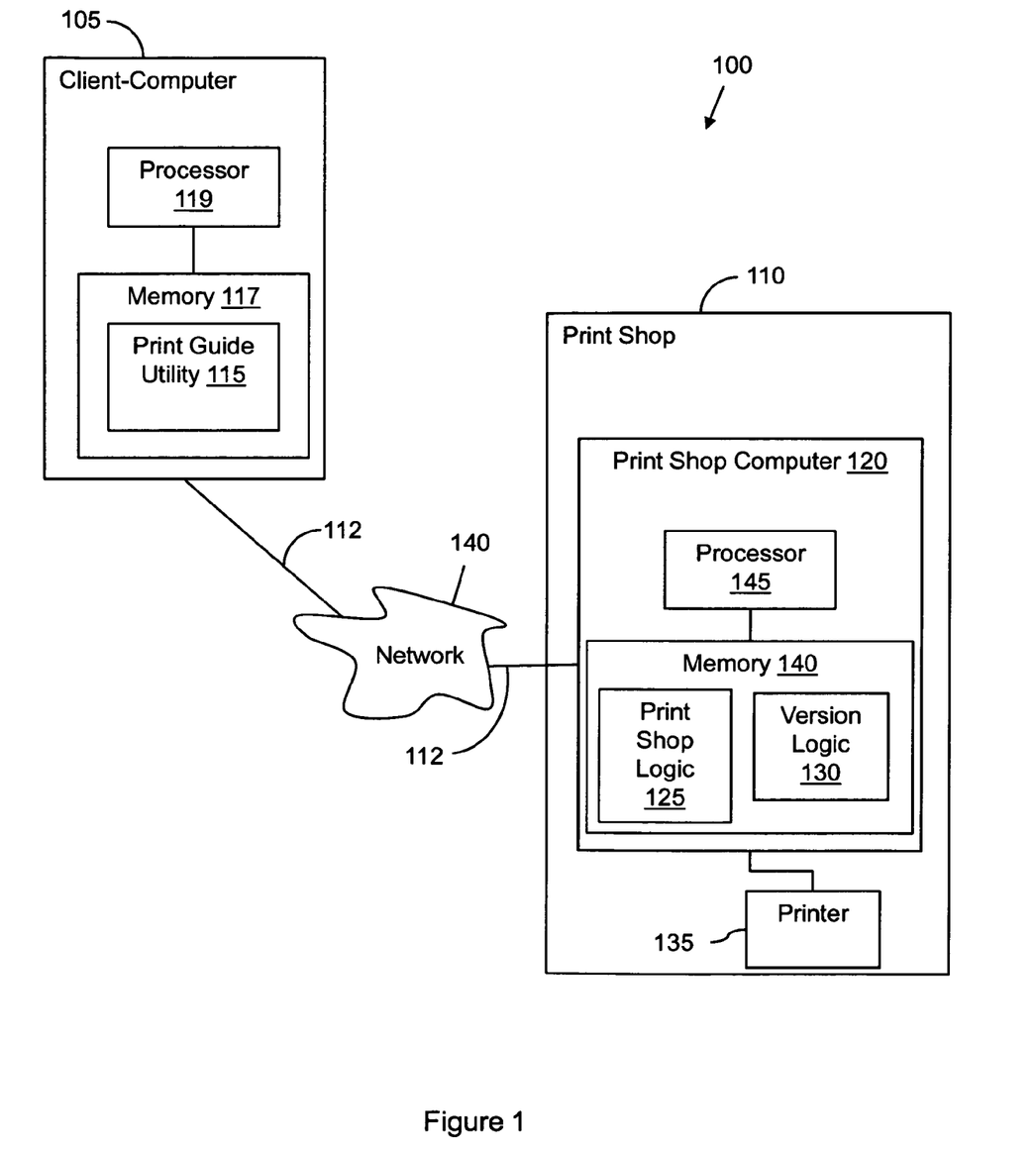
FIG. 1 illustrates one embodiment of a system associated with printing a user manual.

FIG. 1 illustrates an embodiment of a system 100 that prints a user guide. The system 100 includes a client-computer 105 that can communicate with a print shop system 110 through a communications link 112. The communications link can include, without limitation, communications established via the Internet, an intranet, an extranet, a local area network, wide area network, cellular network, and so on. The client computer 105 can be any electronic device that can communicate with a network, such as without limitation, a personal digital assistant, a lap top computer, a desk top computer, a cell phone, and so on.

The client-computer 105 includes a print guide utility 115 that is configured to enable a user of the client-computer 105 to print a user guide associated with the client-computer 105. The print guide utility 115 is stored within a memory 117 within the client-computer 105 and executable by a processor 119. The memory 117 can include without limitation a RAM, ROM, hard disk, other types of computer-readable mediums, and so on. The print guide utility 115 can be initiated, for example, from an icon displayed on the client-computer 105. In some embodiments, when a soft version of a user guide is displayed on a client-computer display, the print guide utility 115 is configured to automatically display a print menu that provides an option to print the user guide. A soft version is an electronic version of a document, editable or not editable, stored electronically in a memory. In other embodiments, the print guide utility 115 is configured to start when a symbol or icon is selected from an application menu.

Generally, the print guide utility 115 is associated with a default user guide. However if multiple user guides exist, the print guide utility 115 may be configured to allow a user to specify a user guide. Alternatively, the print guide utility 115 may be configured to detect user guides on the client-computer 105 and to display a list to allow the user to make a user guide selection from the list.

After selection, the print guide utility 115 is configured to prompt the user to select print job options. For example, the options may include how many copies to print, whether to print single or double sided, and/or whether to print in color or black and white, and so on. Some users may wish to have a printed user guide that is more professional looking than simply a printed copy. For example, options for binding, adding covers, and/or other add-on features can be provided that a print shop can perform.

After the user has selected the desired printing options, the print guide utility 115 generates a print request to print the user guide. Next, the print guide utility 115 transmits the completed print request to a print shop 110 that has a print shop computer 120. In one embodiment, the print shop 110 is remotely located from the client-computer 105 and in other embodiments, the print shop 110 and client-computer 105 can be local to each other. Next, the steps employed by the print guide utility 115 to determine which print shop 110 to send the print request is discussed below.

The print shop computer 120 includes print shop logic 125 and version logic. In one embodiment, the print shop logic 125 and version logic 130 are executable instructions stored in a memory 140 or other computer-readable medium, and executable by a processor 145. The print shop logic 125 is configured to receive and process print requests sent from remote clients such as the client-computer 105. The print shop logic 125 is configured to identify whether a print request includes a request for a user guide. If the print request is for a user guide, a version check will be performed.

The version check is performed by the version logic 130. The version logic 130 is configured to determine whether an update for the user guide exists. In some example embodiments, the version logic 130 is configured to identify whether one or more updated versions of the user guide are available. If more than one update is available, the version logic 130 can provide selectable options to the client-computer 105 allowing a user to select which of the updated versions to print. In some embodiments, when the version logic 130 detects that an updated version exists, the version logic 130 is configured to modify the content of the print request to include the updated version or versions.

The print shop logic 125 is configured to send the modified print request, including the updated version or versions, to a printer 135 to be printed. When the user guide does not require a check for updated versions, the print shop computer 120 may request the printer 135 to print the user guide without checking for update versions.

The preceding examples have been explained with reference to printing a user guide. Other types of documents may be printed. In other embodiments, the print shop logic 125 may detect other document types that fall under the category of "user guide" like upgrading guides, service guides, getting started guides, reference manuals and maintenance manuals. The upgrading and service guides may be unique to specific hardware or a specific client-computer. A getting started guide may be unique to an operating system or software of a specific client-computer. In some embodiments, when these or any other specified documents are detected, the print shop computer 120 will request a version check and the version logic 130 will check for updates for the corresponding document.

In another embodiment, the print guide utility 115 is configured to contact a website to print a user guide. For example, the website can provide an interface that the print guide utility 115 or the client-computer user may use to select a user guide for printing at a print shop. The website may be controlled and/or operated for the producer of the user guide. Once the print request is completed by entering the desired print request information into the interface provided by the website, the website server may then forward a print request to a print shop for processing. In another embodiment, the website may be operated by the print shop itself. Print requests originating at websites may be processed by the print shop computer 120, the print shop logic 125 and the version logic 130 in a similar manner as discussed earlier.

In another embodiment, the print shop logic 125 and the version logic 130 have additional functionality. When the print shop logic 125 identifies a print request is for a user guide, print shop logic 125 may be configured to determine if a partnership exists between the print shop and a producer of the product corresponding to the user guide. If a partnership exists, the version logic 130 then is activated to retrieve the updated version from a network location designated by the producer. Designated partners may be print shops that have business contracts or agreements with the producer to print user guides. For example, there may be an agreement that the print shop will provide a pre-established printing process and can print a user guide with selectable professional formatting and finishing. The producer can also grant access to user guide updates in electronic form through downloads, through website access, and so on.

Figure 2:
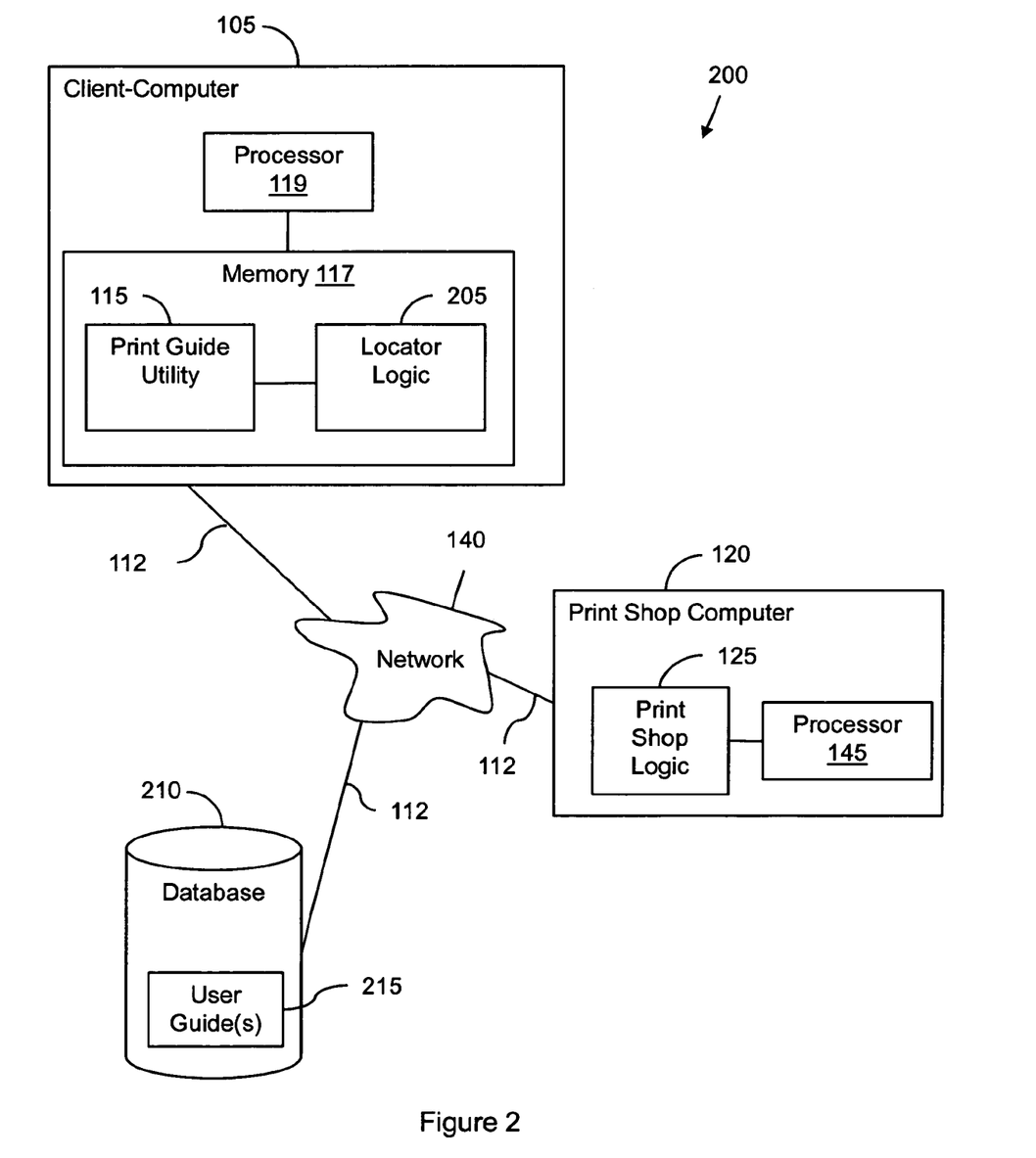
FIG. 2 illustrates another embodiment of a system associated with printing a user manual.

Illustrated in FIG. 2 is another embodiment that includes a locator feature. Similar elements from FIG. 1 are shown with similar reference numbers. For example, a system 200 to print user guides includes the print guide utility 115 (from FIG. 1) and a locator logic 205. In one example, the locator logic 205 is configured to identify one or more print shops located in a vicinity of the client-computer 105. Printing the user guide in a location near the user can make it more convenient for the user to simply pick-up the printed documents. In another embodiment, the software of the user guide may be provided with a hyperlink embedded or associated with the guide. The link points to a location finder website that can be used to locate the nearest print shops. When a user opens the user guide, the locator logic 205 can be configured to detect embedded hyperlinks and to initiate the location process.

In one embodiment, the locator logic 205 is configured to open a web browser and/or establish a network communication channel to access the location finder website identified by the hyperlink. A user of the client-computer 105 may then enter their address or zip-code into the location finder website. Alternatively, an address or zip-code of a location where the completed print job will be picked up at may be entered. For example, if a user is travelling, they may enter the address corresponding to the location that they are visiting. The location finder website then determines distances of different print shops from the address or zip-code entered. The website returns to the locator logic 205 one or more of the nearest print shops. The user may then select which print shop to use for printing. The selected print shop 110 may become the default location for further print requests. Alternatively, if a certain time interval has passed since the last print request, then on a subsequent print request the locator logic 205 may be configured to again determine one or more print shops located in the vicinity of the client-computer 105. By re-determining which print shops are in the desired vicinity, print shops recently built or opened after the last print request can be detected.

In one embodiment, the locator logic 205 will identify the print shops in the vicinity of the client-computer 105. In other embodiments, the print shops in the vicinity of the client-computer 105 are filtered. For example, only those print shops with a partnership existing between the print shop and a producer of the product corresponding to the user guide are returned and presented. The print shop list may also be filtered to only return print shops that are capable of printing the user guide with the professional formatting features requested.

In another embodiment, the system 200 includes a database 210 accessible by the print shop logic 125. The database 210 contains updated versions of user guides 215. The print shop logic 125 is configured (in response to processing the print request) to retrieve an updated version of the user guide from the database 210. In some examples, the database 210 is located in the print shop computer 120 or on another storage device within the print shop 110. Alternatively, the database 210 may be located on a remote storage device and accessed through a network 140.

To make the system of printing a user guide more user friendly, in some example embodiments the print shop logic 125 may provide a variety of options to the print guide utility 115 that can be presented to the client-computer user. The print shop logic 125 may provide selectable delivery options to the print guide utility 115 for delivering a printed copy of the user guide. For example, the user may select overnight delivery to a remote location, request delivery to multiple locations or request delivery at a specific time. The print shop logic 125 may also notify the client-computer 105 that the modified user guide has been printed.

In another embodiment, the print guide utility 115 is configured to provide the user finishing options. Finishing options can include, for example, binding, center folding, saddle stitching, and so on. Finishing options allow a user to request a user guide that looks more professional than a copy merely printed locally on a typical printer. By allowing professional finishing at the print shop 110, this embodiment allows users a way of obtaining a high quality guide without requiring a producer to ship a high quality user guide with every single computer product.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While example methods may illustrate various actions occurring in serial, it is to be appreciated that various actions could occur substantially in parallel.

Figure 3:
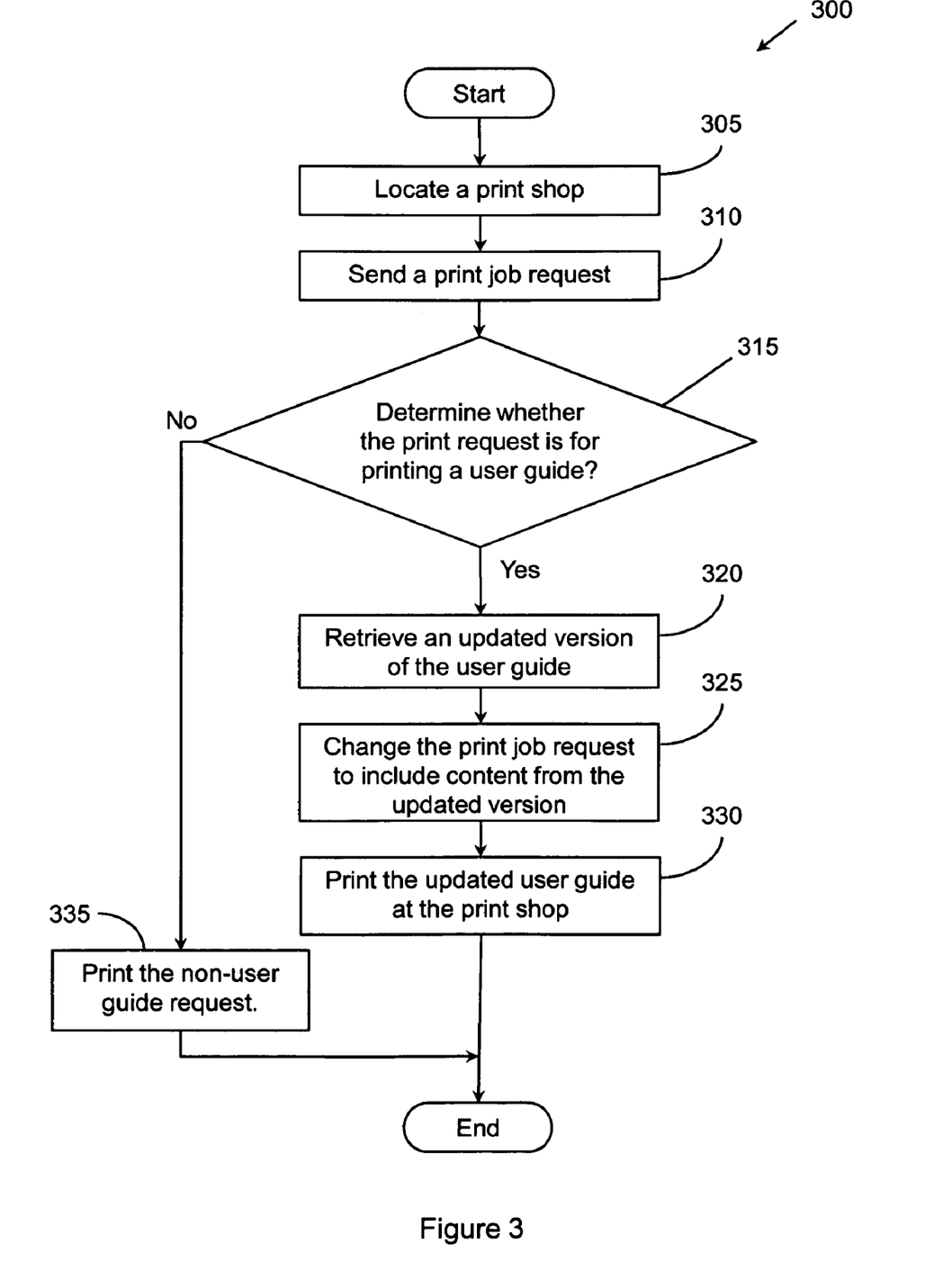
FIG. 3 illustrates one embodiment of a method associated with printing a user manual.

FIG. 3 illustrates a method 300 associated with printing a user guide of a product. The method 300 begins by locating a print shop in a selected location like in a vicinity near a user or in a different pick-up location (Block 305). The print shop may be located as discussed earlier. In one example, when software associated with a client-computer product is installed, a user guide printing icon can be displayed to give the user an option to print a user guide. When the printing icon is selected, it initiates the action of locating a print shop. After the print shop is located, a print job request is sent via a network to the print shop (Block 310). In response to receiving the print job request, a determination is made as to whether the print job request is a request to print a user guide since the print shop may receive many different types of printing requests (Block 315).

If the request is to print a user guide, then the print shop retrieves an updated version of the user guide (Block 320). Of course, more than one updated version may be retrieved. In other embodiments, the updated version may be retrieved from a website of a producer of the computer product. Next, the print job request is changed to include content from the updated version (or versions) to create an updated user guide (Block 325). The updated user guide is printed at the print shop in accordance with the changed print job request (Block 330). If the request is to print any other content (e.g. non-user guide), then the previous actions are by-passed and the non-user guide is printed (Block 335).

Some embodiments may tailor the method 300 toward individuals. One way of tailoring the method 300 is to provide payment options to allow a user to pay for some or all selected printing options. The payment options may be delivered to the user in the form of an electronic user inquiry message. Also, options for delivering the printed updated user guide as well as finishing options to be applied during printing and/or assembly of the user guide may be provided.

Figure 4:
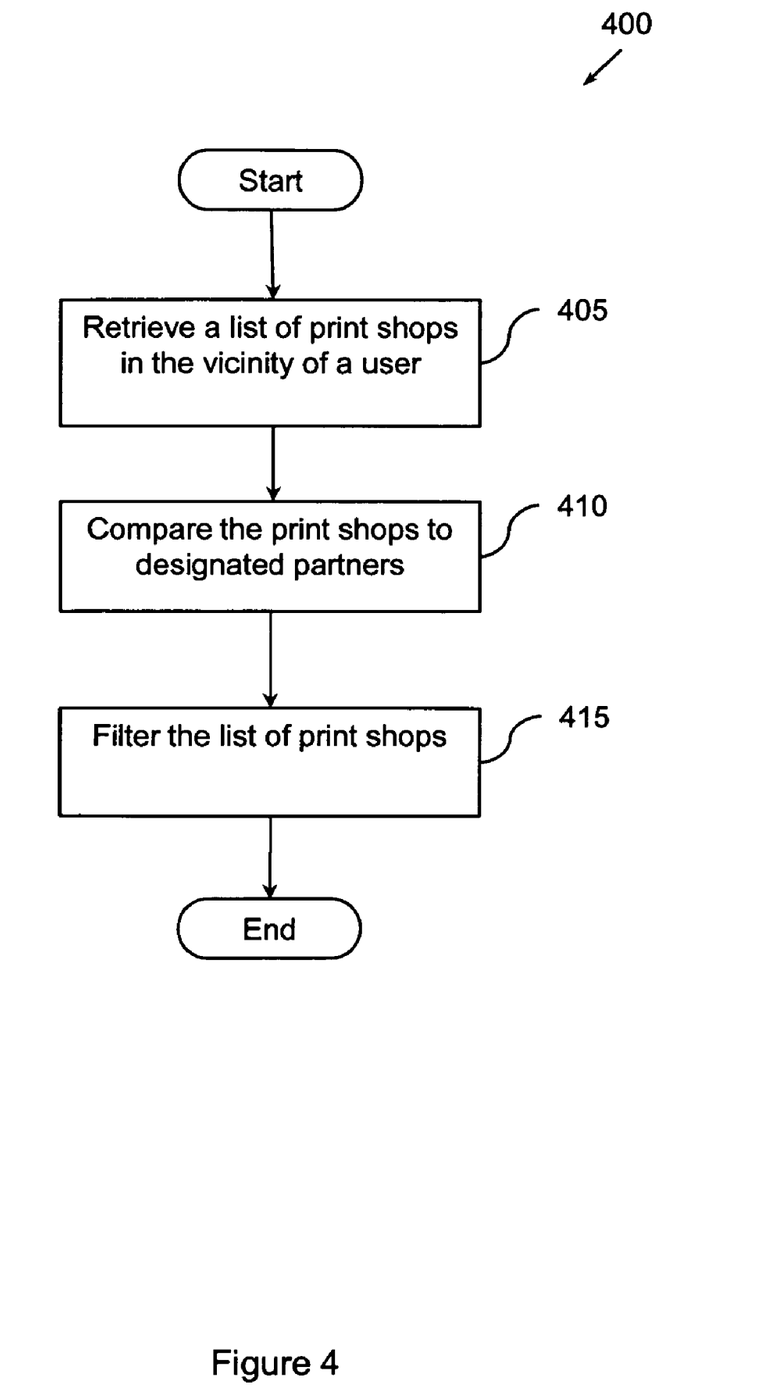
FIG. 4 illustrates one embodiment of a method associated with locating a print shop.

In another embodiment, FIG. 4 illustrates a method 400 associated with locating a print shop. The method includes retrieving a list of print shops in the vicinity of a user of a computer product, which may be in a vicinity of a selected area where the user will pick-up the printing guide (Block 405). Next, the retrieved print shops are compared to a pre-determined list of print shops that are designated partners with the producer of the computer product (Block 410). The list of print shops is then filtered to provide the designated partners as selectable print shops to process a print job request (Block 415). By filtering against a list of designated partners, the user can be directed to a print shop that has a pre-established process for printing the user guides making it easier for the user to print.

Figure 5:
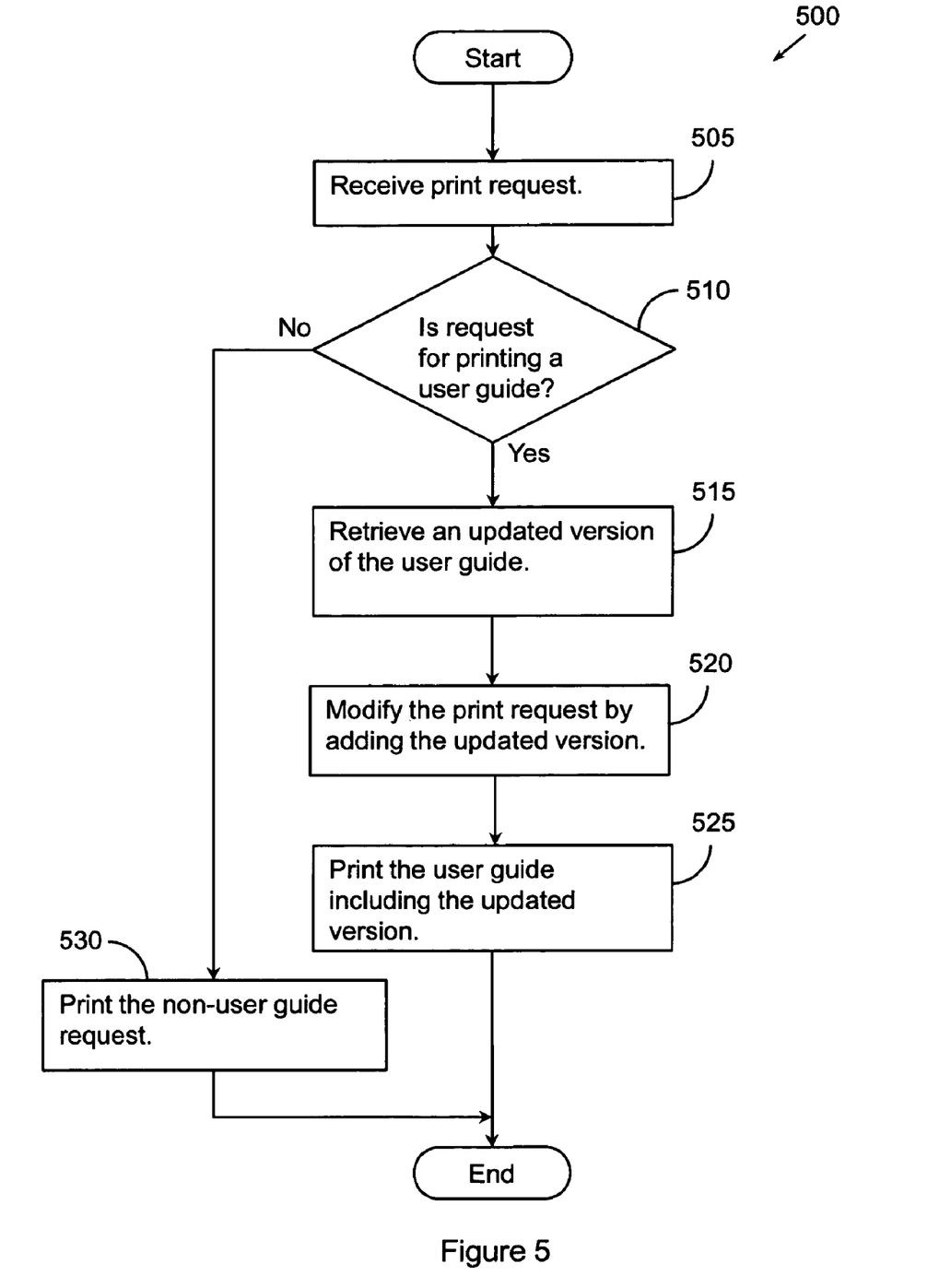
FIG. 5 illustrates one embodiment of a method associated with printing a user manual from a print shop's perspective.

Illustrated in FIG. 5 is another embodiment of an example method 500 associated with printing a user guide of a product from a print shop's perspective. The method 500 begins by receiving a print request at a print shop from a remote user (Block 505). Next, a determination is made to determine if the print request is for printing a user guide or some other type of content (e.g. non-user guide) (Block 510). If the print request is for a user guide, then checks for an updated version of the user guide are made and any updates are retrieved (Block 515). The print request is then modified by adding the updated version to the print request (Block 520). The print request is completed when the user guide including the updated version is printed (Block 525). However, if the request is to print a non-user guide, then the non-user guide is printed (Block 530).

In some example embodiments, the method 500 associated with printing a user guide of a product further includes determining if a partnership exists between the print shop and a producer of the product. If a partnership exists, then the updated version is retrieved from a network location designated by the producer. The network location may be local to one or more facilities operated by the producer or may be on a remote network device.

In other embodiments, the method 500 may include storing a list of associations between user guides and network locations for retrieving updated versions of the corresponding user guides. The associations may be between print shops and the producer of the product to which the user guide refers. The retrieving includes identifying the user guide from the print request and determining the network location from the list of associations that corresponds to the user guide. The retrieving further includes accessing the network location to retrieve one or more updated versions. Retrieving updates from a network location associated with a user guide may generally assure that the updates from the network location are the most current versions.

In some embodiments, the print request may identify the user guide as content to be printed. The modifying of the print request may further include changing the content to be printed to different content which includes the updated version.

In another embodiment, the user guide and current updates can be electronically stored and maintained at the print shop. This can be established when a partnership is created with the producer of a product as previously described. When a print request is received, the electronic user guide is retrieved locally and updated versions are retrieved. Finally, creating an updated user guide for printing can include combining the updated versions with the retrieved electronic user guide.

In yet another example of the method 500, when updated versions are available, selectable options may be provided to a user to select which of the one or more updated versions to print. After the options have been selected, the print request is modified by adding each of the selected updated versions to the request.

In one embodiment, the described methods may be implemented as computer executable instructions stored on a computer-readable medium. When the computer executable instructions are executed by a machine (e.g., processor), the instructions cause the machine to perform the method.

While example systems, methods, and so on have been illustrated by describing examples, and while the examples have been described in considerable detail, it is not the intention of the applicants to restrict or in any way limit the scope of the appended claims to such detail. The illustrative discussions above are not intended to be exhaustive or to limit the invention to the precise forms disclosed. Many modifications and variations are possible in view of the above teachings. The embodiments were chosen and described in order to best explain the principles of the invention and its practical application, to thereby enable others skilled in the art to best utilize the invention and various embodiments with various modifications as are suited to the particular use contemplated.

What is claimed is:

1. A system for printing a user guide based on a print request from a client-computer comprising a print guide utility configured to generate a print request to print a user guide of a product and transmit the print request to a print shop computer at a remote location; the system comprising:
   a print shop computer comprising:
      a print shop logic configured to receive and process print requests received from remote clients, and configured to identify whether a print request includes a request for a user guide;
      a version logic configured to determine whether an updated version of the user guide from a producer of said product exists;
      the version logic being further configured to modify content of the print request to include the updated version; and
   a printer operatively connected to the print shop computer to print the modified print request including the updated version.

2. The system of claim 1, further comprising the client-computer comprising a print guide utility configured to generate a print request to print a user guide of a product and transmit the print request to a print shop computer at a remote location, where the client-computer further comprises:
a locator logic configured to identify one or more print shops located in a vicinity of the client-computer.

3. The system of claim 2, where the client-computer further comprises a print guide utility that, when an electronic copy of a user guide regarding a particular product is displayed, automatically displays a print menu that provides an option to print the user guide.

4. The system of claim 1 where the version logic is further configured to:
identify whether one or more updated versions of the user guide are available;
provide selectable options to the client-computer to select which of the one or more updated versions to print; and
modifying the print request by adding each of the selected updated versions.

5. The system of claim 1 further including:
a database accessible by the print shop logic where the user guide has been stored, and where the print shop logic is configured to retrieve a copy of the user guide from the database in response to processing the print request.

6. The system of claim 1 where the print shop logic is configured to provide selectable delivery options to the print guide utility for delivering a printed copy of the user guide.

7. The system of claim 1 where the print shop logic is configured to provide selectable finishing options to the client-computer to be applied during printing and/or assembly of the user guide.

8. The system of claim 1 where the print shop logic is configured to notify the client-computer that the modified user guide has been printed.

9. The system of claim 1 where the print shop logic is further configured to, in response to identifying the user guide from the print request:
determine if a partnership exists between the print shop and a producer of the product corresponding to the user guide; and
if a partnership exists, the version logic is configured to retrieve the updated version from a network location designated by the producer.

10. A computer-implemented method of printing a user guide of a computer product, the method comprising:
locating a print shop in a vicinity near a user;
sending a print job request via a network to the print shop;
in response to receiving the print job request, determining whether the print job request is a request to print a user guide that instructs a user how to use a specific product, and if so:
retrieving an updated version of the user guide;
changing the print job request to include content from the updated version to create an updated user guide that instructs a user how to use said specific product; and
printing the updated user guide at the print shop in accordance with the changed print job request.

11. The method of claim 10 further including:
in response to installing software associated with the computer product on a computer, providing a user guide printing icon that when selected, initiates the action of locating a print shop.

12. The method of claim 10 where the retrieving includes retrieving the updated versions from a website of a producer of the computer product.

13. The method of claim 10 where the locating a print shop includes:
retrieving a list of print shops in the vicinity of the user;
comparing the print shops to a predetermined list of print shops that are designated partners with a producer of the computer product; and
filtering the list of print shops to provide the designated partners as selectable print shops to process the print job request.

14. The method of claim 13, further comprising further filtering the list of print shops to provide only print shops capable of printing the user guide with professional formatting features selected by the user as being selectable print shops to process the print request.

15. The method of claim 10 where a copy of the user guide is electronically stored at the print shop.

16. The method of claim 10 further including providing payment options for paying for printing the user guide.

17. The method of claim 10 further including providing delivery options for delivering the printed updated user guide.

18. The method of claim 10 further including providing finishing options to be applied during printing and/or assembly of the user guide.

19. A computer-readable medium storing computer-executable instructions that when executed by a computer cause the computer to perform a method, the method comprising:
in response to receiving a print request at a print shop from a remote user, determining if the print request is for printing a user guide of a product;
if the print request is for a user guide, retrieving an updated version of the user guide;
modifying the print request by adding the updated version; and
printing the user guide including the updated version.

20. The computer-readable medium of claim 19, further including:
determining if a partnership exists between the print shop and a producer of the product; and
if a partnership exists, retrieving the updated version from a network location controlled by the producer.

21. The computer-readable medium of claim 19, further including:
storing a list of associations between user guides and network locations for retrieving updated versions of the user guides; and
where the retrieving includes:
identifying the user guide from the print request;
determining the network location from the list of associations that corresponds to the user guide; and
accessing the network location to retrieve one or more updated versions.

22. The computer-readable medium of claim 19, where the print request identifies the user guide as content to be printed, and
where the modifying of the print request includes changing the content to be printed to different content which includes the updated version.

23. The computer-readable medium of claim 19, where the user guide is electronically stored at the print shop before the receiving a print request, where the updated versions are retrieved from a producer of the user guide, and where the modifying the print request includes combining the updated versions with the user guide.

24. The computer-readable medium of claim 19 where the retrieving includes:
identifying whether one or more updated versions of the user guide are available;
providing selectable options to a user to select which of the one or more updated versions to print; and
modifying the print request by adding each of the selected updated versions.

* * * * *